United States Patent
Das et al.

(10) Patent No.: US 7,508,804 B2
(45) Date of Patent: Mar. 24, 2009

(54) SHARED SIGNALING FOR MULTIPLE USER EQUIPMENT

(75) Inventors: Arnab Das, Old Bridge, NJ (US); Farooq Ullah Khan, Manalapan, NJ (US); Ashwin Sampath, Somerset, NJ (US); Hsuan-Jung Su, Ocean, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 912 days.

(21) Appl. No.: 10/115,966

(22) Filed: Apr. 5, 2002

(65) Prior Publication Data
US 2003/0189918 A1  Oct. 9, 2003

(51) Int. Cl.
*H04B 7/216* (2006.01)
(52) U.S. Cl. .................. 370/342; 370/335
(58) Field of Classification Search ........... 370/320, 370/335, 342, 349, 441, 479, 496; 455/450, 455/451, 452.1; 714/758
See application file for complete search history.

(56) References Cited

U.S. PATENT DOCUMENTS

| 6,697,347 | B2* | 2/2004 | Ostman et al. ........... 370/335 |
| 6,915,473 | B2* | 7/2005 | Bolourchi et al. ........ 714/755 |
| 6,934,275 | B1* | 8/2005 | Love et al. ............. 370/342 |
| 6,975,868 | B2* | 12/2005 | Joshi et al. ............ 455/452.1 |
| 7,283,508 | B2* | 10/2007 | Choi et al. ............ 370/341 |
| 7,352,722 | B2* | 4/2008 | Malladi et al. .......... 370/335 |
| 7,406,070 | B2* | 7/2008 | Nilsson ............... 370/342 |
| 2002/0141367 | A1* | 10/2002 | Hwang et al. .......... 370/335 |
| 2002/0141436 | A1* | 10/2002 | Toskala .............. 370/442 |
| 2002/0145985 | A1* | 10/2002 | Love et al. ........... 370/328 |
| 2002/0145988 | A1* | 10/2002 | Dahlman et al. ........ 370/335 |
| 2002/0170013 | A1* | 11/2002 | Bolourchi et al. ....... 714/758 |
| 2002/0172208 | A1* | 11/2002 | Malkamaki ........... 370/400 |
| 2003/0039230 | A1* | 2/2003 | Ostman et al. ......... 370/335 |
| 2003/0095605 | A1* | 5/2003 | Das et al. ............. 375/262 |
| 2003/0157953 | A1* | 8/2003 | Das et al. ............. 455/522 |
| 2004/0097253 | A1* | 5/2004 | Malkamaki ........... 455/522 |
| 2005/0207369 | A1* | 9/2005 | Bolourchi et al. ....... 370/320 |
| 2005/0250521 | A1* | 11/2005 | Joshi et al. ........... 455/466 |
| 2006/0099955 | A1* | 5/2006 | Kasapi et al. .......... 455/450 |
| 2006/0176866 | A1* | 8/2006 | Wakabayashi ......... 370/342 |

FOREIGN PATENT DOCUMENTS

JP  63190492  8/1988
WO  WO 0180579  10/2001

OTHER PUBLICATIONS

3rd Generation Partnership Project; Technical Specification Group Radio Access Network; High Speed Downlink Packet Access; Physical Layer Aspects (Release 5); 3GPP TR 25.858 V5.0.0., Mar. 2002, pp. 1-31.
3rd Generation Partnership Project: "3GPP 1-10 TS 25.214 V5.0.0: Physical Layer Procedures (FDD)"; 3GPP TS 25.214 V5.0.0, XX, XX, Mar. 2002, pp. 1-56.

(Continued)

*Primary Examiner*—Chi H. Pham
*Assistant Examiner*—Kevin Mew (57) ABSTRACT

A composite signaling message part is formed to include at least two segments, each segment including data identifying a different user equipment (UE). The part further includes a cyclic redundancy code (CRC) generated by jointly encoding the at least two segments. In a further aspect of the method, more than one shared control channel jointly carrying a signaling message are power controlled such that each shared control channel carrying more data associated with one of the UEs is power controlled in accordance with that UE.

35 Claims, 7 Drawing Sheets

OTHER PUBLICATIONS

European Search Report, dated Aug. 10, 2004.
3rd Generation Partnership Project, "Technical Specification Group Radio Access Network; High Speed Downlink Packet Access: Physical Layer Aspects (Release 5)"; 3GPP TR 25.858 V5.0.0, Mar. 2002; pp. 1-31.
Japanese Office Action dated Sep. 24, 2008.

* cited by examiner

Figure 1 t=0, TRANSMISSION BEGINS

SHARED SIGNALING FOR MULTIPLE USER EQUIPMENT

CROSS REFERENCE TO RELATED CASES

The present invention is related to U.S. patent application Ser. No. 09/991,111 of Arnab DAS et al., entitled "A METHOD FOR ENCODING AND DECODING CONTROL INFORMATION IN A WIRELESS COMMUNICATIONS SYSTEM" filed on Nov. 16, 2001, the entire contents of which is incorporated by reference herein.

BACKGROUND OF THE INVENTION

1. Technical Field

The invention relates generally to wireless communication systems and, more particularly, to methods for encoding and decoding information that is transmitted in control channels in such systems.

2. Description of Related Art.

In wireless communication systems, an air interface is used for the exchange of information between a user equipment (UE) and a base station or other communication system equipment. The air interface typically comprises a plurality of communication channels. In the well-known High Speed Downlink Packet Access (HSDPA) specification in the Universal Mobile Telecommunication System (UMTS) standard, for example, a High Speed Downlink Shared Channel (HS-DSCH) is used for transmissions from a base station to a plurality of UEs. To facilitate data transmission via a HS-DSCH, signaling information is provided via shared control channels. High Speed Shared Control Channels (HS-SCCHs) are associated with the HS-DSCHs.

HS-SCCHs are used for transmitting signaling information that is needed for the UE to process the corresponding data transmission. By way of example, signaling information in the HS-SCCHs can include transmission format information such as code information (which codes are used for the data transmission), modulation information, Transport Block Size (TBS), and so on. The HS-SCCHs are used on a shared basis among all the UEs such that all the UEs would read all the HS-SCCHs configured in a cell of a wireless network.

In the evolving wireless data communication systems, such as the well-known 1x-EV-DO and 1xEV-DV standards and the aforementioned High Speed Downlink Packet Access (HSDPA) specification in the Universal Mobile Telecommunication System (UMTS) standard, a scheduling function is moved from a base station controller to the UEs in order to provide "fast" scheduling based on channel quality feedback from the UEs. Moreover, technologies such as adaptive modulation and coding (AMC) and hybrid automated repeat request (HARQ) have been introduced to improve overall system capacity. In general, a scheduler selects a UE for transmission at a given time and adaptive modulation and coding allows selection of the appropriate transport format (modulation and coding) for the current channel conditions seen by the UE.

In HSDPA, for example, the scheduler, AMC and HARQ functions are provided by a MAC-hs (medium access control—high speed) controller located in a base station. The MAC-hs is responsible for handling the data transmitted on the air interface. Furthermore the MAC-hs has responsibility to manage the radio link physical resources allocated to HSDPA. In general, the functions carried out by MAC-hs include flow control, scheduling/priority handling, Hybrid ARQ, and a physical layer transport format, e.g., modulation, coding scheme, etc.

In order to enable the above-mentioned technologies, control signaling is needed both on the uplink (UE to base station) and downlink (base station to UE). The uplink signaling consists of ACK/NACK feedback for HARQ operation and channel quality indication (CQI). The uplink signaling in HSDPA is carried over a high speed dedicated physical control channel (HS-DPCCH). In the downlink signaling for HSDPA, the HS-SCCH is used to carry the scheduling and HARQ control information for the current transmission to the UE.

Control or signaling information in the signaling message that is transmitted via a HS-SCCH is typically encoded, e.g., with block codes or convolutional codes. As such, a UE must decode all the information in the HS-SCCH in order to decode the signaling message, which is then used for processing the corresponding data transmission over a corresponding HS-DSCH.

Figure 1:
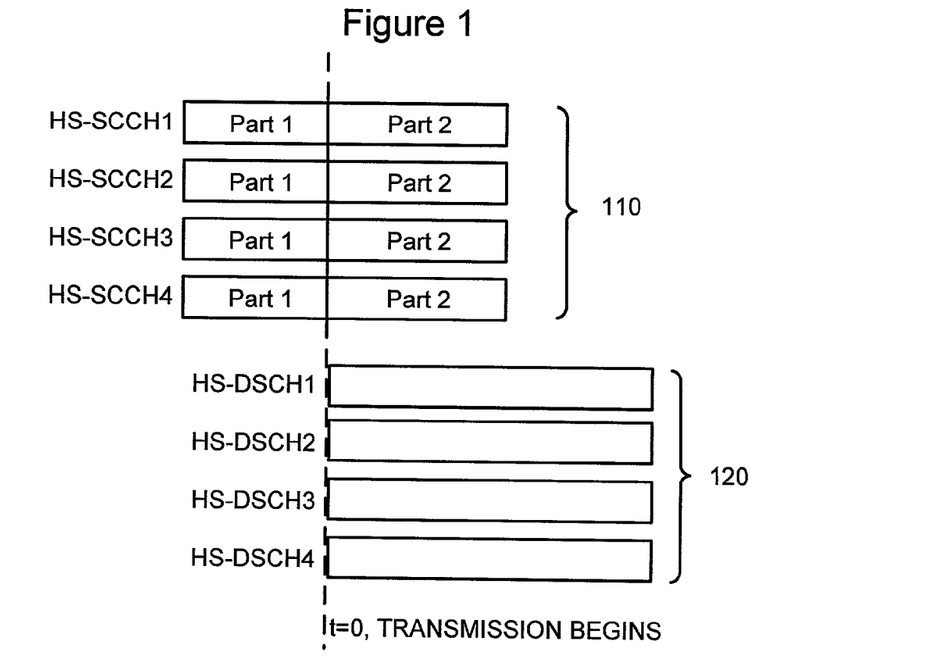
FIG. 1 illustrates the relationship between shared control channels and shared downlink data channels in accordance with the invention.

FIG. 1 illustrates the relationship between HS-SCCHs 110 and their corresponding shared HS-DSCH counterparts 120. In FIG. 1, each HS-SCCHx (x=1 to 4) carries signaling message information pertinent to a corresponding HS-DSCHx (x=1 to 4). The number of HS-DSCHs, and therefore the number of HS-SCCHs that may be used, can vary for each transmission time interval (TTI), depending on the number of UEs being simultaneously scheduled in the TTI. Accordingly, the configuration of HS-SCCHs and HS-DSCHs in FIG. 1 enables data channelization signaling codes and power resources to be divided among four simultaneous transmissions.

Referring again to FIG. 1, control channel data on each HS-SCCH is typically divided into two parts. Part I, as will be explained further, consists of control or signaling information related to data channelization signaling codes that have been assigned to a particular UE, for example. Part II, as will be explained further, contains HARQ related information, and other transport information.

The control signaling described above currently suffers from several disadvantages, namely higher error rates, miss/false alarm probabilities and inefficient resource usage. These problems are due to the separate encoding that is required for each of the shared control channels. With separate coding, each shared control channel carries, for example, cyclic redundancy code (CRC) data bits and tail bits separately for each UE in a cell of the network that is to receive a data transmission from a base station, for example.

Figure 2:
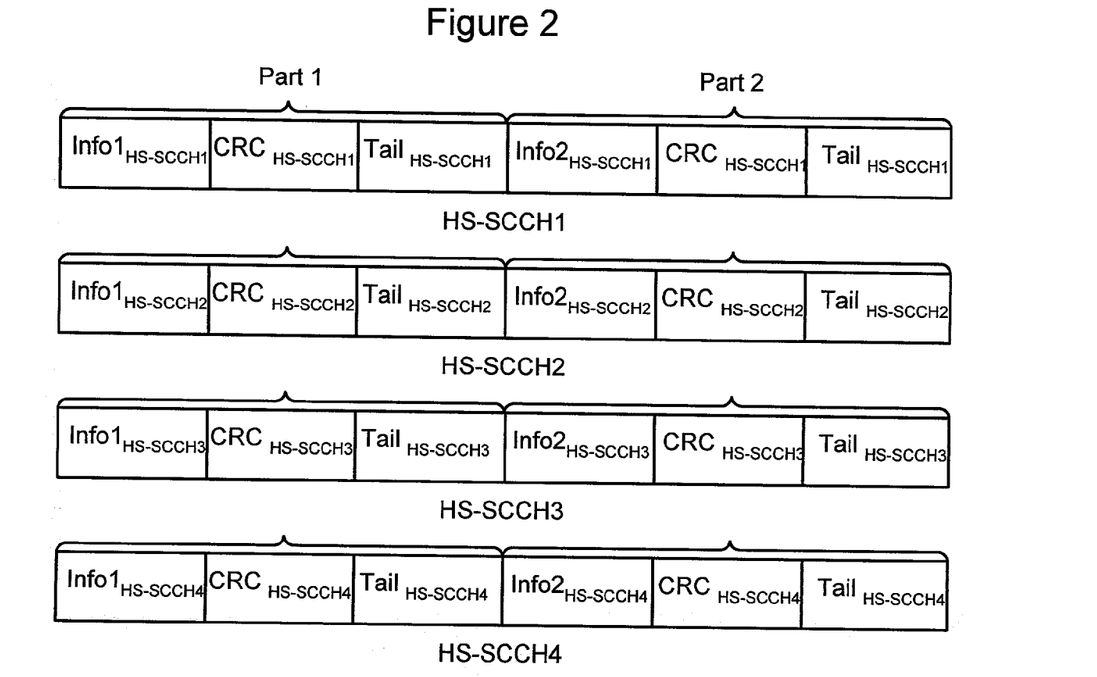
FIG. 2 illustrates a conventional structure of a HS-SSCH.

FIG. 2 illustrates the contents of Part 1 and Part 2 in a signaling message that is to be transmitted over each HS-SCCH in further detail Part 1 and Part 2 contain several segments. For each HS-SCCH, Part 1 contains an information bit segment having a unique set of information bits (Info1HS-SCCHx, where x=1 to 4, a cyclic redundancy check code (CRC) segment that is used for error detection as is known, and a tail bits segment that terminate Part 1 of the HSSCCH. For example, the information bits may include a 7-bit channelization code signaling, a 1-bit modulation code, 10-bit UE-ID code of a single UE-ID, and other control or signal bit information. Similarly Part 2 of each HS-SCCH has a unique set of information bits (Info2 HS-SCCHx, where x=1 to 4, cyclic redundancy check code (CRC) bits and tail bits. The information bits in Part 2 may include HARQ-related data, transport format and resource related data such as TBS and other control information, as well as UE-ID and CRC information for a single UE.

To maintain complexity low at the UE, HS-SCCH designs typically allow Part I information to be transmitted prior to the commencement (i.e., before t=0) of data transmission, as shown in FIG. 1. With the current configuration, each UE must decode each Part I on each HS-SCCH, in every TTI, in order to determine (a) whether or not the transmission was intended for that particular UE, and (b) if the transmission was intended for that particular UE, the UE must decode Part I and figure out what channelization codes the corresponding HS-DSCH will arrive on. In other words, a UE must separately decode each Part 1 and Part 2 in order to fully decode the HS-SCCH that is intended for it, so that the UE may begin to buffer the intended transmission data over the HS-DSCH that corresponds to the successfully decoded HS-SCCH.

Accordingly, each UE must decode up to four (4) HS-SCCHs in every TTI, prior to commencement of data transmission. From a UE processing complexity perspective, it is therefore desirable to limit the number of bits in Part 1 that require processing, and also desirable that the processing be as simple as possible.

Figure 3:
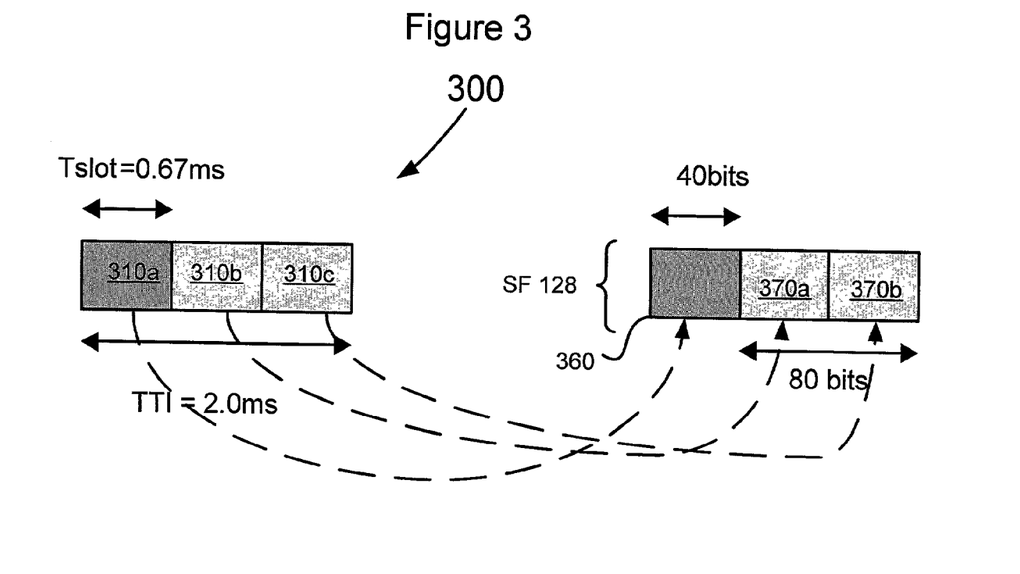
FIG. 3 illustrates how Part 1 and 2 data are transmitted within channelization codes over a transmission time interval.

FIG. 3 illustrates a HSDPA transmission time interval (TTI) for a HS-SCCH. The TTI 300 comprises 3-timeslots 310a to 310c, each of a duration 0.667 ms each. Slot 310a contains Part 1 information, and slots 310b-c contain Part 2 information. FIG. 3 also illustrates the arrangement of channelization codes for transmitting the Part 1 and Part 2 information of a HS-SCCH. The HS-SCCH 350 information is transmitted over three channelization code slots, being divided into Part 1 (transmitted in the code in slot 360) and part 2 information (transmitted in the code in slots 370a-b). Accordingly, Part 1 information of 310a is transmitted within the first slot 360 and Part 2 information 310b-c are transmitted in the second and third channelization code slots 370a and 370b, as shown by the dotted arrows in FIG. 3. Each HS-SCCH uses a channelization code of spreading factor (SF) 128. With QPSK modulation and a chip rate of 3.84 Mc/s in UMTS, 40 bits are transmitted in a single timeslot.

The details of HS-SCCH control fields for HSPDA, i.e., the information bits and CRC bits of Parts 1 and 2, are summarized in Table 1. Note that a UE ID is not explicitly included in the control fields of Part 1 or Part 2, but an x-bit CRC is calculated over the control fields of Part 1 and 2, where x=8, 16, 24 or 32 CRC bits. In Table 1, the CRC code has a 16-bit length.

TABLE 1

HS-SCCH Information

|  | SCCH Control Field | Size [Bits] |
|---|---|---|
| Transport-format and Resource related Information (TFRI) | Channelization code set | 7 |
|  | Modulation | 1 |
|  | Transport block set size and transport channel identity | 6 |
| Hybrid-ARQ-related Information (HARQ information) | Hybrid-ARQ process number | 3 |
|  | Redundancy version | 3 |
|  | New-data indicator | 1 |
|  | CRC | 16-bits |

Figure 4:
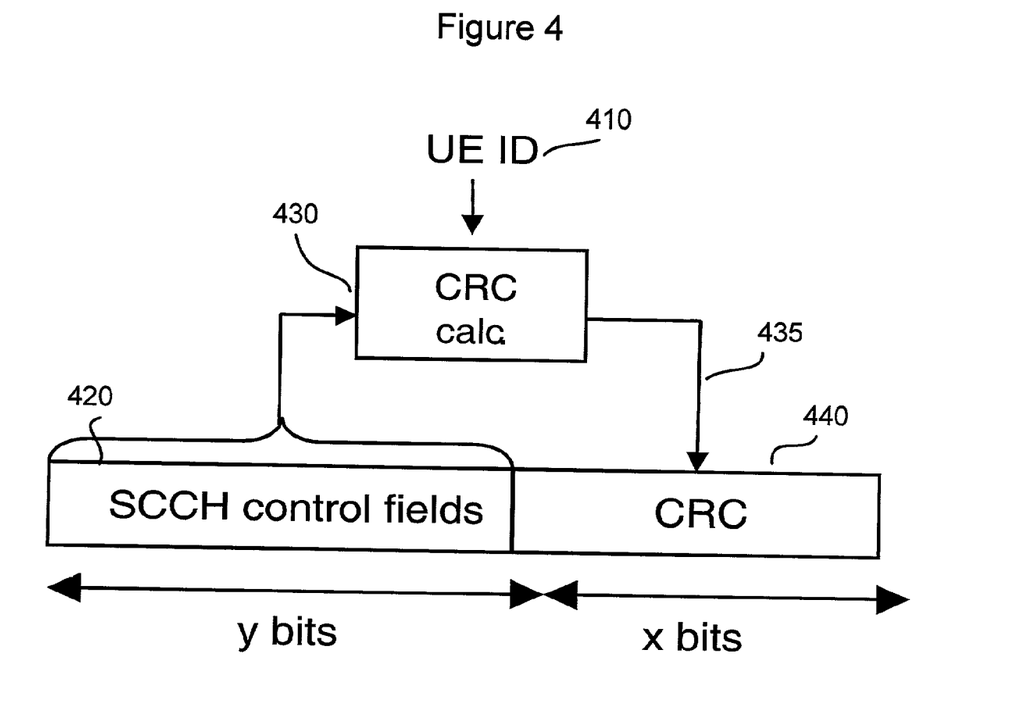
FIG. 4 illustrates an example of a UE-specific CRC calculation.

FIG. 4 illustrates an example of a UE-specific CRC calculation. One way of calculating a UE-specific CRC is to append the UE ID 410 with the other control fields 420 and perform a standard CRC calculation 430. At the time of transmission, the UE ID 410 is removed from the control fields 240 of Part 1 and Part 2, and the control fields 420 along with the calculated CRC 430 are transmitted (see line 435). When a UE receives a HS-SCCH transmission, it will perform the CRC check 440 by appending its own UE ID with the other control fields in Part 1 and separately in Part 2. If the CRC checks with the transmitted CRC, the UE assumes that the transmission is intended for the UE. If the CRC does not check with the transmitted CRC, the UE will ignore the transmission on the corresponding HS-DSCH.

Referring again to FIG. 2, The total number of bits in Part 1 for a single HS-SCCH is given by the expression Ntotal1=Ninfo1+NCRC1+Ntail1, where Ninfo1 is the number of information bits contained in Part 1 of a HS-SCCH, NCRC1 is the number of CRC bits for Part 1, and Ntail1 is the number of tail bits in Part 1. With 4 HS-SCCHs, the total number of bits carried within a TTI with separate coding on each control channel is M*Ntotal1. For example, assuming that Ninfo1=20, NCRC 1=8 and Ntail 1=8, the total number of bits that must be coded at the base station, or decoded by the UE, for 4 HS-SCCHs equals 144 bits (4*36). This total number of bits is a processing burden, and is an inefficient use of resource due to separate coding that is required for each of the HS-SCCHs. As discussed above, with separate coding, each HS-SCCH carries CRC and tail bits separately.

Likewise, the total number of bits in Part 2 information of a single HS-SCCH is given by Ntotal2=Ninfo2+NCRC2+Ntail2, where Ninfo2 is the number of information bits contained in Part 1, NCRC2 is the number of CRC bits for Part 2, and Ntail2 is the number of tail bits in Part 2 of the signaling message. Since Part 2 is separately coded at the base station and decoded at the UE, the total number of bits to process at the UE is also a processing burden.

SUMMARY OF THE INVENTION

In one aspect of the method, a composite signaling message part is generated for transmission over more than one shared control channel in a wireless communication system. In one embodiment, the composite signaling message part is formed to include at least two segments, each segment including data identifying a different user equipment (UE). In this embodiment, the forming step forms the part to include an error correction code generated by jointly encoding the at least two segments. In another embodiment, the composite signaling message part is formed to include at least two segments, each segment including data providing information on a control channel to a different user equipment (UE). In this embodiment, the forming step forms the part to include an error correction code generated by jointly encoding the at least two segments.

In another aspect of the method, at least one composite signaling message part is transmitted over more than one shared control channel. In one embodiment, a different portion of a composite signaling message part is transmitted over at least one same time slot in each of the shared control channels; the part including at least two segments and each segment including data identifying a different user equipment (UE). In this embodiment, the part further includes a cyclic redundancy code (CRC) generated by jointly encoding the at least two segments. In another embodiment, a different portion of a composite signaling message part is transmitted over at least one same time slot in each of the shared control channels, the part of the signaling message including at least two segments and each segment providing information on a dedicated control channel that is dedicated to a different UE. In this embodiment, the part further includes a cyclic redundancy code (CRC) generated by jointly encoding the at least two segments.

In a further aspect of the method, more than one shared control channel jointly carrying a signaling message are power controlled. The signaling message includes data for more than one user equipment (UE). A portion of the signaling message is assigned to each shared control channel such that each shared control channel carries more data associated with one of the UEs than the other UEs. A power of each shared control channel is controlled based on the UE associated with the assigned portion.

In a still further aspect of the method, a signaling message for transmission over more than one shared control channel in a wireless communication system is generated. A first part of a signaling message is formed for transmission in first parts of the shared control channels. The first part of the signaling message includes start information for more than one user equipment (UE), and the start information for each UE identifies a first physical channel in a sequence of physical channels dedicated to the UE. A second part of the signaling message is also formed for transmission in second parts of the shared control channels. The second part of the signaling message includes end information for more than one UE, and the end information for each UE identifies a last dedicated physical channel in the sequence of physical channels dedicated to the UE.

BRIEF DESCRIPTION OF THE DRAWINGS

The present invention will become more fully understood from the detailed description given hereinbelow and the accompanying drawings, wherein like elements are represented by like reference numerals, which are given by way of illustration only and thus are not limitative of the present invention and wherein.

DETAILED DESCRIPTION

Although the principles of the invention are particularly well-suited for wireless communications systems based on the well-known High Speed Downlink Packet Access (HS-DPA) specification in the Universal Mobile Telecommunication System (UMTS) standard, and will be described in this exemplary context, it should be noted that the embodiments shown and described herein are meant to be illustrative only and not limiting in any way. As such, various modifications will be apparent to those skilled in the art for application to other transmission systems and are contemplated by the teachings herein. Additionally where used below, user equipment (UE) is synonymous to a mobile station in a wireless network.

Forming Composite Message Portions and HS-SCCHs

Figure 5A:
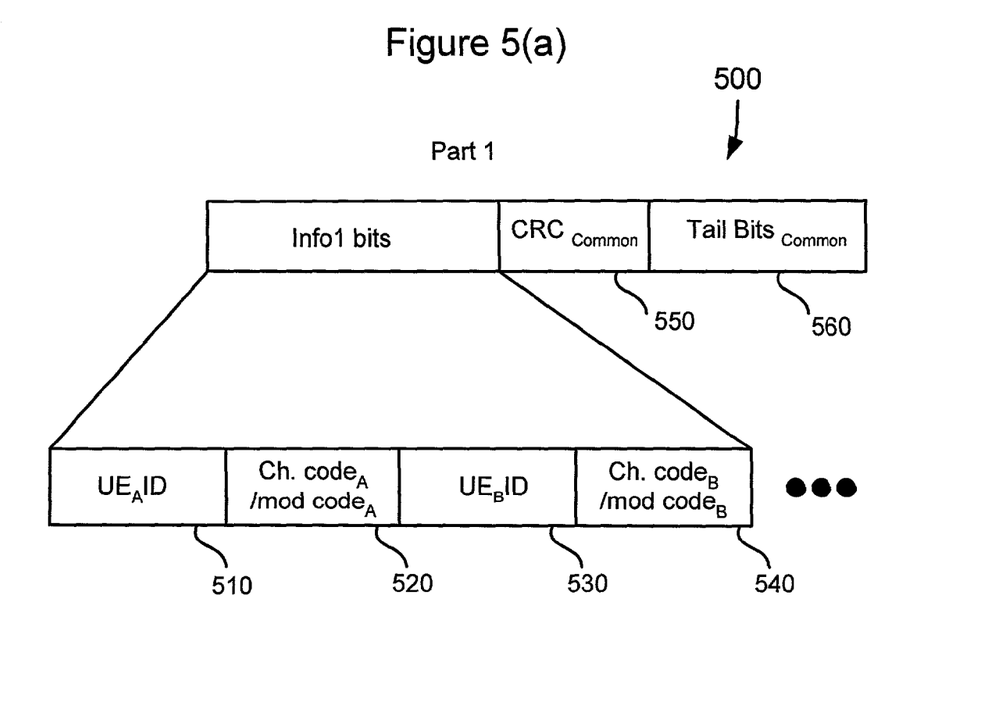
FIG. 5(a) illustrates joint coding of Part 1 of a signaling message according to one exemplary embodiment of the invention.

In a first embodiment of the present invention, instead of generating signaling messages having a one-to-one correspondence with the HS-SCCHs, a composite Part 1 message portion is formed as illustrated in FIG. 5(a). Individual Part 2 message portions are formed as described above with respect to FIG. 2. Referring to FIG. 5(a), the composite Part 1 message portion includes the channelization code, modulation and UE ID information for all UEs receiving a transmission within a specific TTI. In this example, there are only 2 UEs that are to receive a transmission, it being understood that Part 1 of the HS-SCCHs could carry channelization code, modulation and UE ID information for M UEs receiving a transmission.

Accordingly in FIG. 5(a), the composite Part 1 includes a UE ID segment 510 for UEA, channelization and modulation code segment 520 for UEA, a UE ID segment 530 for UEB, and channelization and modulation code segment 540 for UEB. In FIG. 5(a), the UE ID's are explicit in the composite Part 1. This information is jointly error correction encoded using, for example, cyclic redundancy code (CRC). The single set of CRC code bits (segment 550) and one set of tail bits (segment 560) are included in the composite Part 1. Because information for multiple UEs is jointly encoded in forming composite Part 1, the amount of processing a UE must perform to decode the composite Part 1 is greatly reduced.

Specifically, the number of bits that a UE must process Ntotal1 is defined as Ntotal1=(M*Ninfo1)+NCRC1+Ntail1. A comparison of coding rates with the conventional method described above with respect to FIG. 2 is given in Table 2. In determining the coding rate results of Table 2, it was assumed that Ninfo1=20, NCRC1=8 and Ntail 1=8.

TABLE 2

HS-SCCH Part 1 Comparisons

| Number of HS-SCCHs | Number of channel bits | Approximate coding rate | Coding rate with the prior art method | Coding rate with the invention |
|---|---|---|---|---|
| 1 | 40 | 0.55 | 0.75 | 0.75 |
| 2 | 80 | 0.45 | 0.75 | 0.43 |
| 3 | 120 | 0.42 | 0.75 | 0.32 |
| 4 | 160 | 0.40 | 0.75 | 0.26 |

As seen in Table 2, the coding rate decrease as the number of HS-SCCHs a UE must process increases.

Figure 5B:
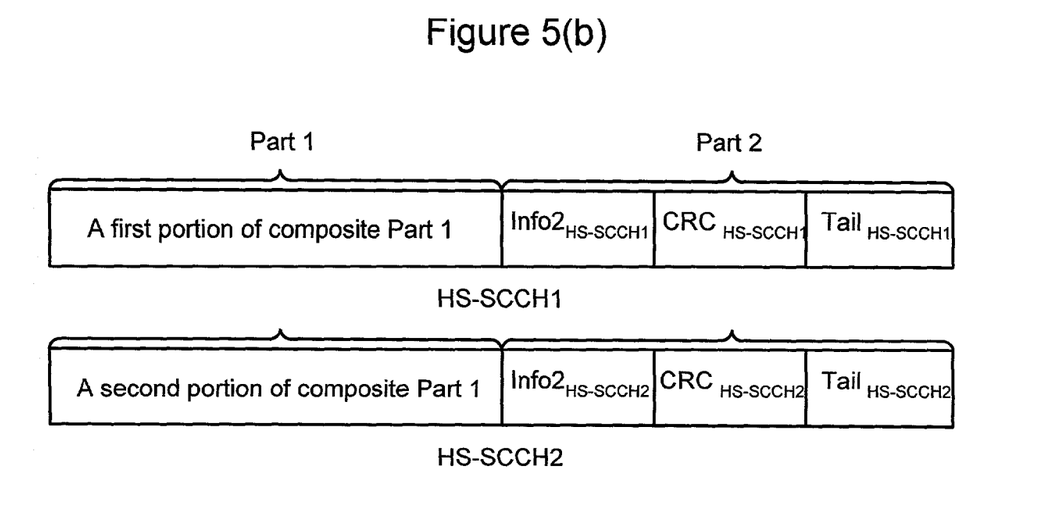
FIGS. 5(b) and 5(c) illustrate how Part 1 and 2 data are transmitted within channelization codes over a transmission time interval in accordance with the embodiment of FIG. 5(a)

FIG. 5(b) illustrates how Part 1 and 2 data are transmitted within channelization codes over a transmission time interval in accordance with the embodiment of FIG. 5(a). In FIG. 3, it was described that in conventional encoding schemes, Part 1 of a signaling message was transmitted over a single code in a single timeslot of an HS-SCCH, and Part 2 was transmitted over a single code in two timeslots of an HS-SCCH. Accordingly, only one code per timeslot can be transmitted over an HS-SCCH using the conventional approach. In other words, a UE must decode all four Part 1s in order to find which Part 1 contains the signaling information intended for that UE, such that the UE can receive the corresponding transmission data over a HS-DSCH.

FIG. 5(b) illustrates the two HS-SCCHs for transmitting the composite Part 1 and Part 2 message portions to UEA and UEB consistent with the example of FIG. 5(a). As shown, a first portion of the composite Part 1 is transmitted in the Part 1 of HS-SCCH1 and a second portion of the composite Part 1 is transmitted in the Part 1 of HS-SCCH2. Part 2 of the HS-SCCH1 and HS-SCCH2 is the same as that shown in FIG. 2.

Figure 5C:
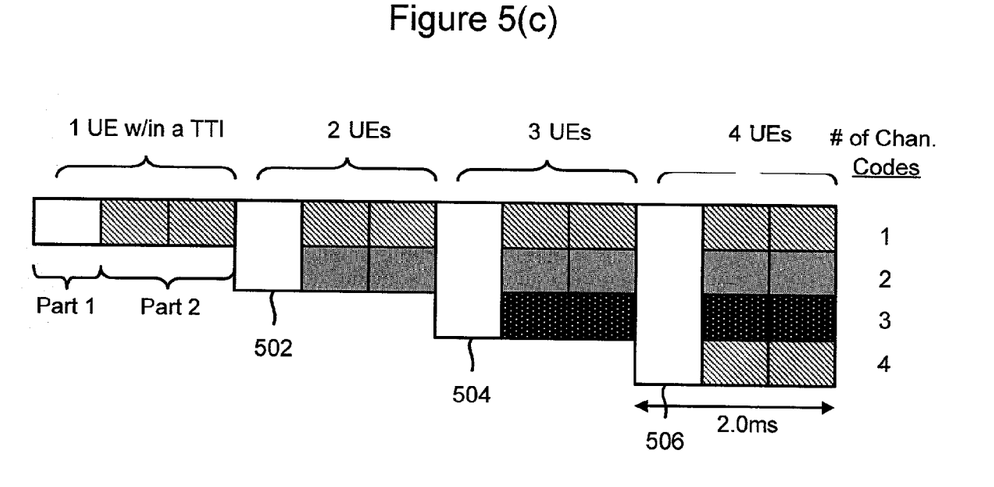

FIG. 5(c) shows that if 3 UEs share the HS-SCCH, the composite Part 1 is transmitted over the Part 1s 504 of three HS-SCCHs. Similarly, if four UEs share the HS-SCCHs, composite Part 1 is transmitted over the Part 1s 506 of three HS-SCCHs.

In order to decode the jointly encoded signaling message, the UE receives the Part 1s of the HS-SCCHs and decodes the composite Part 1. If the composite Part 1 includes identification information for the UE, the UE knows the Part 2 of which HS-SCCH to decode based on the position of the identification information. For example, if the UE ID is the third UE ID, then the UE knows to decode Part 2 of the HS-SCCH3.

Alternatively, the UE decodes a portion of the jointly coded information in order to receive the data transmission. For example, the decoding may be a partial decoding as is described in co-pending U.S. patent application Ser. No. 09/991,111 of Arnab DAS et al., entitled "A METHOD FOR ENCODING AND DECODING CONTROL INFORMATION IN A WIRELESS COMMUNICATIONS SYSTEM" filed on Nov. 16, 2001, the entire contents of which is incorporated by reference herein.

As a further alternative, instead of having multiple UE ID information appended with the other control information in Part 1, multiple UE ID's could also be carried implicitly by scrambling the control information with a UE-specific code, such as in the case of FIG. 4 where a UE-specific CRC is used. The CRC will only check OK for the desired UE. As such, in these implicit methods there is no field in the HS-SCCH (in either Part 1 or Part 2) carrying explicit UE ID bits.

Figure 6:
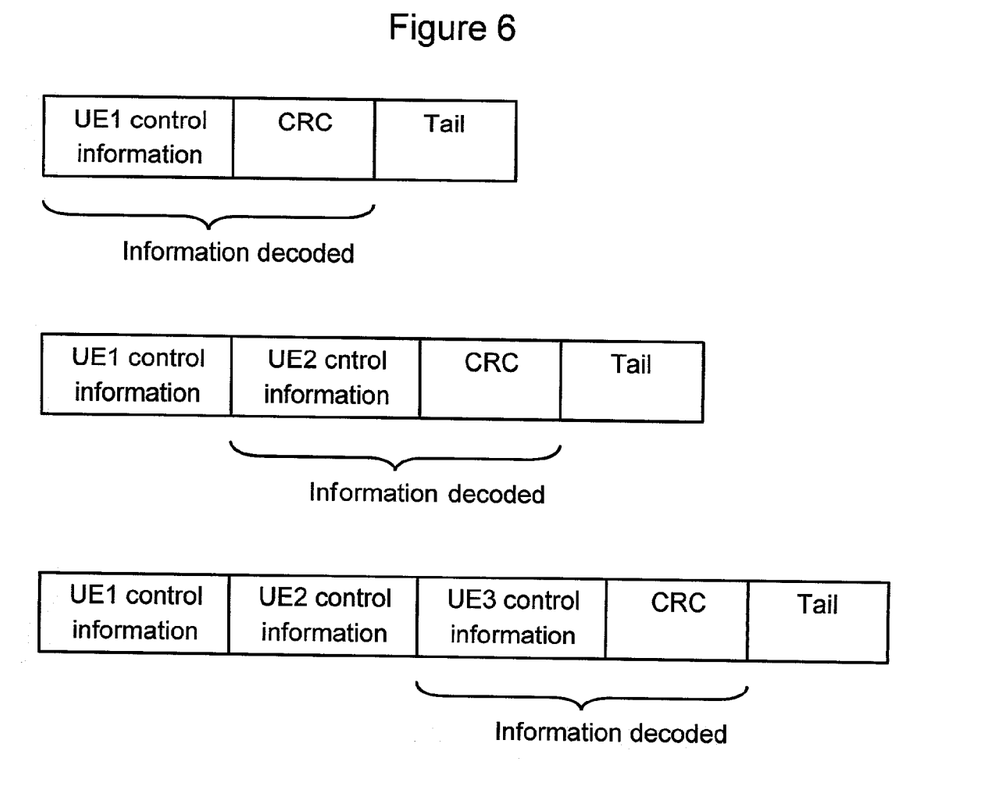
FIG. 6 illustrates a method of decoding the jointly coded data in accordance with the invention.

FIG. 6 briefly illustrates this partial decoding principle. For example, in FIG. 6, a UE will first try to perform a CRC check after decoding the Part 1 information, assuming transmission for one UE. If the CRC fails, the UE will try to decode the control information by assuming transmission for 2 UEs. However, the UE has already decoded information for one UE. Therefore, a sequential decoding approach can be used where the UE does not need to decode the already decoded information. This approach reduces the processing load at the UE.

Figure 7A:
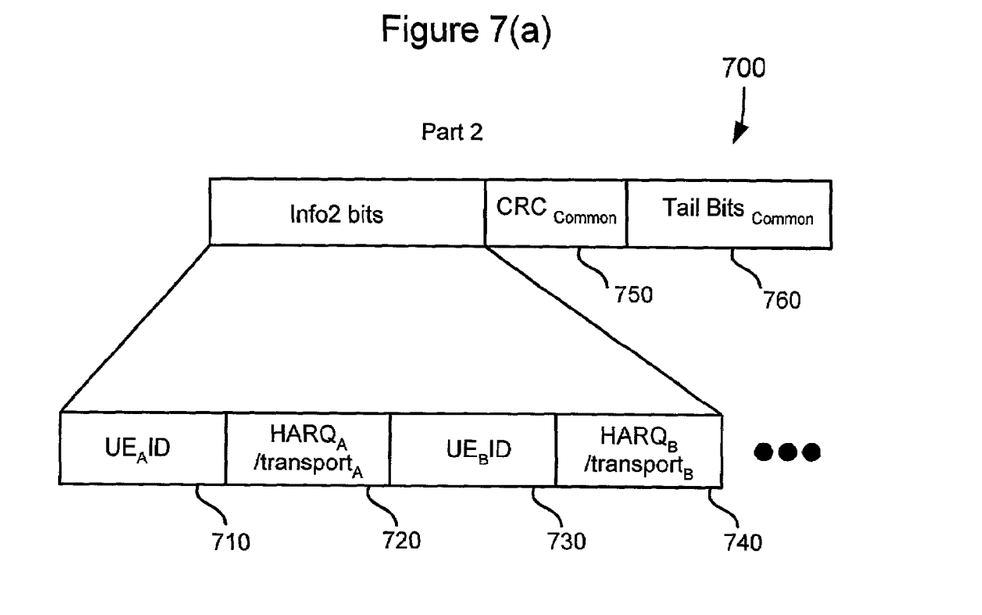
FIG. 7(a) illustrates joint coding of Part 1 and Part 2 of a HS-SCCH according to another exemplary embodiment of the invention.

FIG. 7(a) illustrates embodiment of the invention where both a composite Part 1 message portion and a composite Part 2 message portion are formed. Refer to FIG. 5(a) and the corresponding description above for the formation of the composite Part 1. The composite Part 2 is similarly formed, albeit for the Part 2 information. Using the same two UE example as used for FIG. 5 and Referring to FIG. 7(a), composite Part 2 (700) includes a UE ID segment 710 for UEA, a HARQ control and format segment 720 for UEA, a UE ID segment 730 for UEB, and a HARQ control and format segment 720 for UEB. In FIG. 7(a), the UE ID's are explicit in Part 2. This information is jointly error correction encoded using, for example, cyclic redundancy code (CRC). The single set of CRC code bits (segment 750) and one set of tail bits (segment 760) are included in the composite Part 2P. Because information for multiple UEs is jointly encoded in forming composite Part 2, the amount of processing a UE must perform to decode the composite Part.

Specifically, the number of bits in Part 2 that must be processed, Ntotal2, by a UE is defined as Ntotal2= (M*Ninfo2)+NCRC2+Ntail2. With M control channels, the total number of bits carried within a TTI using joint coding on each HS-SCCH is M* Ntotal2. A comparison of coding rates with conventional method described above with respect to FIG. 2 is given in Table 3. In determining the coding rate results of Table 3, it was assumed that Ninfo2=20, NCRC 2=8 and Ntail 2=8.

TABLE 3

HS-SCCH Shared Part-2 details

| Number of HS-SCCH | Number of channel bits | Approximate coding rate | Coding rate with the prior art method | Coding rate with the invention |
|---|---|---|---|---|
| 1 | 80 | 0.55 | 0.350 | 0.350 |
| 2 | 160 | 0.45 | 0.350 | 0.250 |
| 3 | 240 | 0.42 | 0.350 | 0.217 |
| 4 | 320 | 0.40 | 0.350 | 0.200 |

The format for the Part 2 information is available to the UEs that successfully decode Part 1 information. Accordingly, there is no need to explicitly signal the Part 2 format (i.e., the presence of N number of UE IDs in Part 1 indicate that Part 2 has been coded with control information from N UEs. There is one-to-one mapping between Part 1 information and Part 2 information. The Part 1 information is sent in a specific order, e.g. UE ID A, UE ID B, etc. Therefore, when a UE sees its UE ID in Part 1, it also knows its UE ID position within Part 2. For example, if the UE ID B appears at a position 2, this means that the position 2 in the Part 2 information also carries control information for UE B.

Figure 7B:
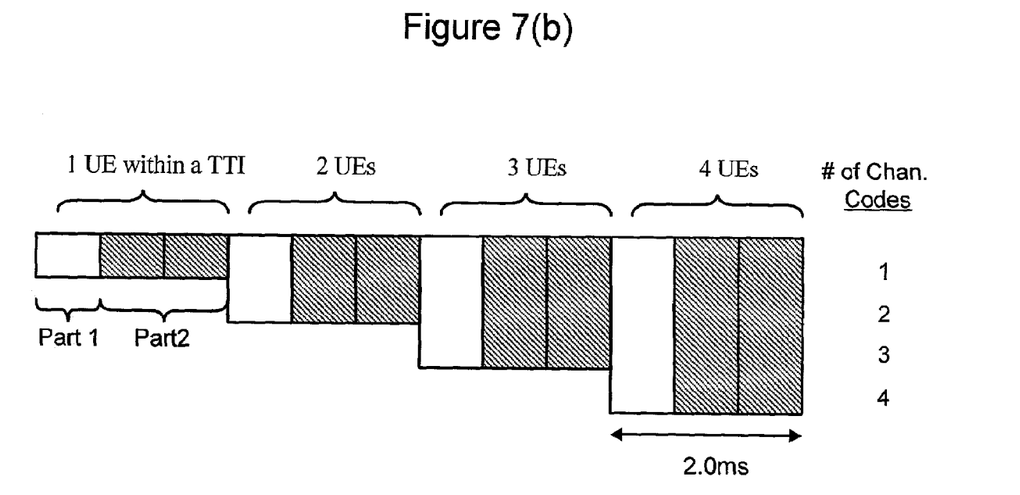
FIG. 7(b) illustrates how Part 1 and 2 data are transmitted within channelization codes over a transmission time interval in accordance with the embodiment of FIG. 7(a)

FIG. 7(b) illustrates how Part 1 and 2 data are transmitted within the HS-SCCHs over a transmission time interval in accordance with the embodiment of FIG. 7(a). As shown, the composite Part 1 message portion is divided among the Part 1 s of the HS-SCCHs and the composite Part 2 message portion is divided among the Part 2s of the HS-SCCHs.

Therefore, a signaling message may be generated and transmitted over one or more HS-SCCHs by jointly encoding UE-ID segments of both Part 1 and Part 2. Moreover, in addition to joint coding of UE-IDs in both Part 1 and Part 2 of the signaling message, only a single set of tail bits are used for convolutional coding, and only a single set of CRC bits are used for the error check, thus reducing the amount of bits that a UE must process in order to determine if there is a transmission intended for it on a corresponding HS-DSCH.

Reduction of Channelization Code Information in HS-SCCHs

Figure 8:
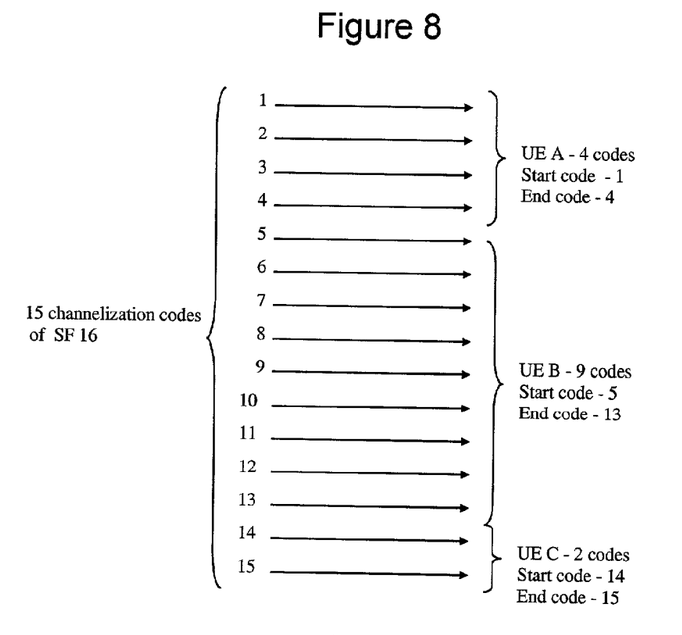
FIG. 8 illustrates an embodiment where channelization code bits may be reduced in accordance with the coding method of the invention.

FIG. 8 illustrates an embodiment where channelization code bits may be reduced in accordance with the coding method of the invention. The joint coding of the Part 1 information can also reduce the number of bits needed for the code information. In FIG. 8, assume that a cell allocates 15 SF16 channelization codes to three different UEs, i.e. UE A, UE B and UE C. Using the conventional approach, a start code and end code indication are required, separately for each of the UEs. However, when joint coding is used, only a start code indication is needed for all but the last UE (UE C). The end indication for the i-th UE can be obtained from the start indication of the (i+1)th UE.

FIG. 8 illustrates this principle. In FIG. 8, the code information consists of start1, start5, start14 and end15 bits. With a total of 16 SF16 codes, 4-bit indications can be used to indicate a start or end. For example, when 1 information is carried for three UEs, the total number of code information bits will only be 16 bits. In the conventional approach, a start and end code is needed separately for each UE. Therefore, with three UEs code multiplexed within a TTI, the total number of code information bits will be 6*4 (for the 4 HS-SCCH's) or 24 bits.

Power Control of HS-SCCHs

Power control is important because since composite Part 1, and in another embodiment composite Part 1 and composite Part 2, information carries information for multiple UEs within a TTI.

In one embodiment, the HS-SCCHs are power controlled based on the UE with the worst-case scenario channel conditions within the TTI. And, if there is only a single UE within the TTI, the Part 1 information is power controlled only to the scheduled UE.

Figure 9:
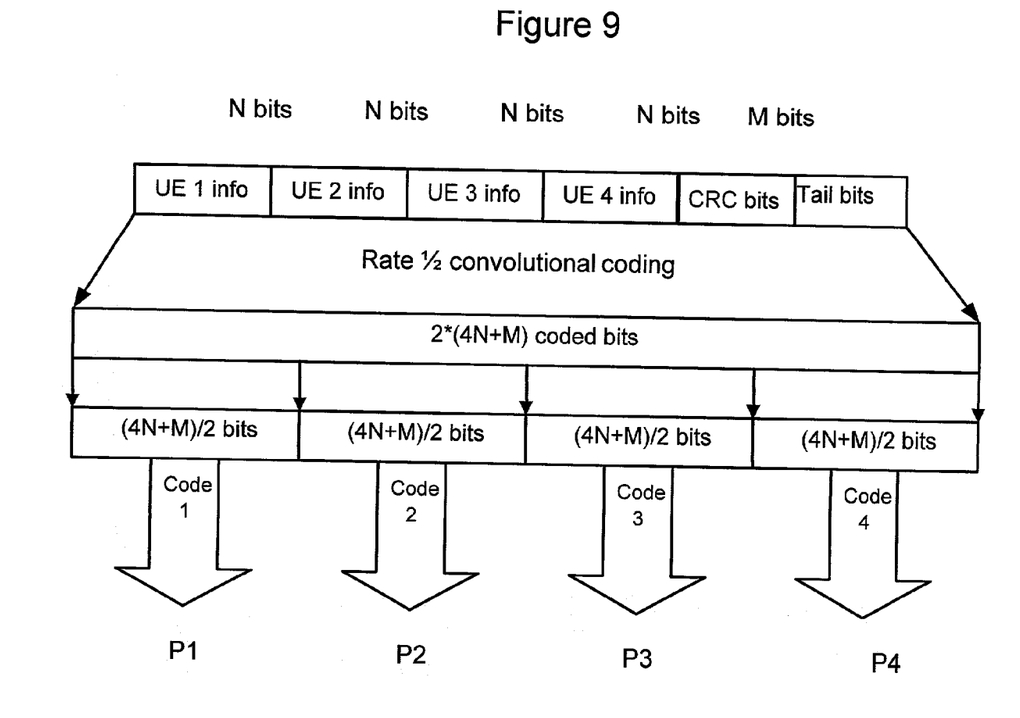
FIG. 9 illustrates power control for the HS-SCCHs in accordance with the invention.

Another embodiment will be described with respect to FIG. 9. After joint coding composite Part 1 with a rate ½ convolutional coder, the bits are slit into four equal parts. Each of these four parts is then transmitted over a channelization code (i.e., an HS-SCCH). Different powers can be used on different channelization codes. For example, the decoding of UE 1 information is mostly affected by the SNR on channelization codes 1 and 2. This is due to the use of convolutional coding/decoding where decoding of i-th information bit is affected by the bits (i+1), (i+2), . . . , (i+P) and so on, depending upon the constraint length of the convolutional code. The constraint length is the number of shift registers in the convolutional code, each register storing 1 bit of information. The impact is lesser as the distance P between bits becomes larger and larger.

An exemplary power control scheme has channelization code 1 power controlled to a UE 1, channelization code 2 to UE 2 and so on. In one embodiment, the UEs are arranged in composite Part 1 such that in FIG. 9, UE1 is the worst and UE 4 is the best UE in terms of channel quality. This is due to the fact that, even though UE 1 information decoding can be affected by SNR on code 2, code 3 and code 4, the impact is smaller compared to power on code 1 (e.g., most of the UE 1 info bits are mapped to coded bits carried over code 1). Accordingly, different powers can be used on the different channelization codes. The power used on code x is Px (where x=1, 2, 3, 4). With UE 1 being the worst UE and UE 4 being the best UE in terms of channel quality, the power P1-P4 used on codes 1, 2, 3 and 4, respectively, will follow the rule P1>P2>P3>P4. In other words, there is no need to power control the jointly coded information to the UE having the worst channel quality.

Therefore, power control may be effected for one or more HS-SCCHs jointly carrying a signaling message for a plurality of UEs by assigning part of the signaling message to each HS-SCCH. This is so that each HS-SCCH carries more data associated with one particular UE than other UEs, so that transmit power of that HS-SCCH is controlled in accordance with the assigned part of the signal message for the corresponding UE.

In the embodiment where a composite Part 1 message portion is formed but no a composite Part 2 message portion, the Part 2 of the HS-SCCHs are power controlled based on the UEs for which data is carried. In the embodiment where composite Part 1 and 2 message portions are formed, the Part 2 of the HS-SCCHs are power controlled in the same manner discussed above with respect to FIG. 9.

Dividing the Channelized Code Information Among Part 1 and Part 2 in HS-SCCHs

Figure 10A:
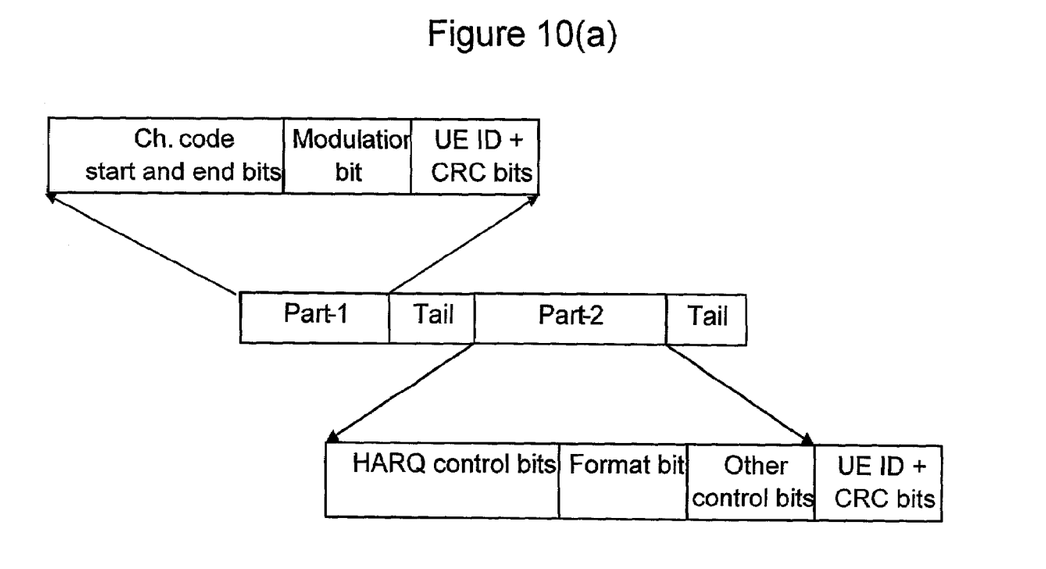
FIGS. 10(a) and 10(b) illustrate a conventional HS-SCCH configuration and an exemplary HS-SCCH configuration in accordance with an embodiment of the invention.

Conventionally, entire channelization code signaling bits for identifying the HS-DSCHs are carried in Part 1 of an HS-SCCH. FIG. 10(a) illustrates the current HS-SCCH configuration. The Part 1 information is carried over 1-slot (as in FIG. 3) of the HS-SCCH while Part 2 information is carried over the remaining 2 slots of the HS-SCCH. The control and signaling information carried in Part 1 of the signaling message is more than half the information carried in Part 2. However, as seen in FIG. 3, the transmission duration of Part 1 (one 0.667 ms timeslot) is half the transmission duration for Part 2 (two slots). Accordingly, Part 1 of an HS-SCCH requires more power than Part 2 for the same frame error rate (FER).

The power imbalance between 1 and Part 2 is undesirable and will result in inefficient use of radio resources. This is due to the fact that, in order to maintain transmit power constant during Part 1 and Part 2 transmissions, the worst case power will be used (Part 1 power in this case). Therefore, Part 2 will be transmitted with more power than is required to meet the FER target power. This results in a waste of resources.

Figure 10B:
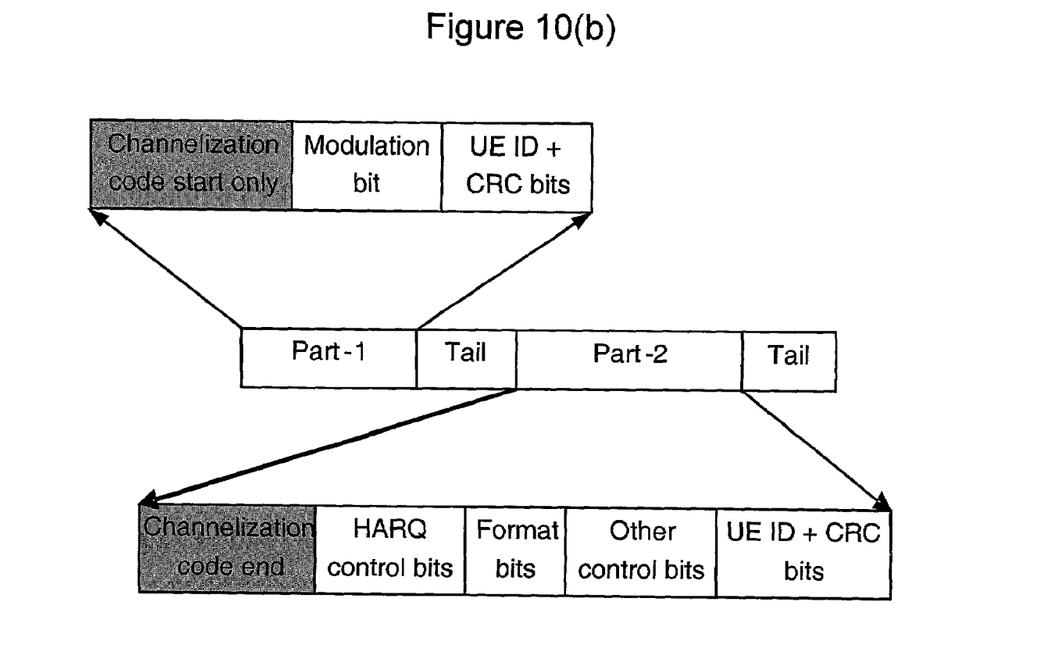

In order to alleviate the power imbalance problem, some of the control bits in Part 1 can be moved to Part 2. FIG. 10(b) illustrates the concept of splitting channelization code bits for identifying the HS-DSCHs between Part 1 and Part 2 in accordance with the invention. In general, the UE needs only the control or signaling start information before the start of an HS-DSCH. Therefore, as seen in FIG. 10(b), the channelization code start information remains in Part 1 of the signaling message, while channelization end code bits are carried in Part 2. After receiving Part 1 data (UE ID, channelization code start indication, etc.), a UE buffers all the HS-DSCH codes within its capability, starting from the channelization code start indication. The UE then determines the exact number of codes allocated to it after receiving the channelization code end indication in Part 2.

Therefore, the embodiment of FIG. 10(b) illustrates a process by which a signaling message is generated for transmission over a plurality of HS-SCCHs by apportioning or splitting the start and end code indications for the channelization codes between Part 1 and Part 2 of the message. The start code indications for a plurality of UEs are formed in Part 1 of the signaling message carried on each HS-SCCH, and the end code indications are formed in part 2 of the signaling message carried on each HS-SCCH.

The invention being thus described, it will be obvious that the same may be varied in many ways. The above-described algorithms has been described as comprised of several components, flowcharts or blocks, it should be understood that the encoding and decoding methods can be implemented in application specific integrated circuits, software-driven processor circuitry, or other arrangements of discrete components. Such variations are not to be regarded as a departure from the spirit and scope of the invention, and all such modifications as would be obvious to one skilled in the art are intended to be included within the scope of the following claims.

We claim:

1. A method of generating a composite signaling message part of a signaling message that is to be transmitted on more than one shared control channel in a wireless communication system, the signaling message comprised of a plurality of composite signaling message parts, each composite signaling message part further composed of a plurality of segments, comprising:

generating a composite signaling message part having at least two segments, each of the at least two segments including data identifying a different user equipment (UE); and concurrently transmitting the signaling message on the shared control channels to a plurality of UEs over a transmission time intervals, wherein the generating step includes generating an error correction code for the composite signaling message part by jointly encoding the at least two segments.

2. The method of claim 1, wherein the generating step forms the part to include tail bits.

3. The method of claim 1, further comprising:

including data on channelized codes and modulation of dedicated control channels dedicated to the different UEs in the part.

4. The method of claim 1, further comprising:

including hybrid automated repeat request and transport format data of dedicated control channels dedicated to the different UEs in the part.

5. The method of claim 1, wherein the shared control channels are High Speed Shared Control Channels of High Speed Downlink Packet Access.

6. A method of generating a composite signaling message part for transmission over more than one shared control channel in a wireless communication system, comprising:

forming a composite signaling message part to include at least two segments, each of the at least two segments including data identifying a different user equipment (UE) and each segment including data providing information on a dedicated control channel that is dedicated to a different user equipment (UE); and concurrently transmitting the signaling message on the shared control channels to a plurality of UEs within a transmission time intervals, wherein the forming step forms the Part to include an error correction code generated by jointly encoding the at least two segments.

7. The method of claim 6, wherein the forming step forms the part to include additional segments identifying the different UEs.

8. The method of claim 6, wherein the forming step forms the part to include an error correction code generated by jointly encoding the at least two segments and the additional segments.

9. The method of claim 6, wherein the forming step forms the part to include tail bits.

10. The method of claim 6, wherein the shared control channels are High Speed Shared Control Channels of High Speed Downlink Packet Access.

11. A method of transmitting at least one composite signaling message part over more than one shared control channel, comprising:

concurrently transmitting a different portion of a composite signaling message part over at least one same time slot in each of the shared control channels, the part including at least two segments, each segment including data identifying a different user equipment (UE), wherein the part further includes an error correction code generated by jointly encoding the at least two segments.

12. The method of claim 11, wherein the error correction code is a cyclic redundancy code (CRC).

13. The method of claim 11, wherein the part further includes tail bits.

14. The method of claim 11, wherein the part further includes data on channelized codes and modulation of dedicated control channels dedicated to the different UEs in the signaling message.

15. The method of claim 11, wherein the part further includes hybrid automated repeat request and transport format data of dedicated control channels dedicated to the different UEs in the signaling message.

16. The method of claim 11, wherein the shared control channels are High Speed Shared Control Channels of High Speed Downlink Packet Access.

17. A method of transmitting at least one composite signaling message part over more than one shared control channel, comprising:

concurrently transmitting a different portion of a composite signaling message part over at least one same time slot in each of the shared control channels, the part of the signaling message including data for identifying at least two user equipments (UEs), the data for each UE providing information on a dedicated control channel that is dedicated to the UE, wherein the part further includes an error correction code generated by jointly encoding the at least two segments.

18. The method of claim 17, wherein the error correction code is a cyclic redundancy code (CRC).

19. The method of claim 17, wherein the part further includes tail bits.

20. The method of claim 17, further comprising:

concurrently transmitting another composite signaling message part over at least one same other time slot in each of the shared control channels, the another part including data identifying the UEs.

21. The method of claim 17, wherein the shared control channels are High Speed Shared Control Channels of High Speed Downlink Packet Access.

22. A method of controlling power of more than one shared control channel jointly carrying a signaling message, the signaling message including data for more than one user equipment (UE) and including an error correction code generated by jointly encoding segments of the signaling message including information identifying different user equipment, comprising:

assigning a portion of the signaling message to each shared control channel such that each shared control channel carries more data associated with one of the UEs than the other UEs, each of the portions of the signaling message including data identifying more than one UE, a portion of the signaling message being concurrently transmitted on each shared control channel over a transmission time interval;

controlling a power of each shared control channel based on the UE associated with the assigned portion.

23. The method of claim 22, wherein the data includes information on dedicated control channels dedicated to the UEs.

24. The method of claim 23, wherein the information includes at least one of channelized codes of dedicated control channels dedicated to the UEs, modulation of the dedicated control channels, hybrid automated repeat request of the dedicated control channels and transport format data of the dedicated control channels.

25. The method of claim 22, wherein the error correction code is a joint code for data that includes information on dedicated control channels dedicated to the UEs.

26. The method of claim 22, further comprising: arranging the data in the signaling message such that data associated with UEs have a worst channel quality come first.

27. A method of generating a signaling message for transmission over more than one shared control channel in a wireless communication system, comprising:

forming a first part of a signaling message, the first part of the signaling message for transmission in first parts of the shared control channels, the first part of the signaling message including start information for more than one user equipment (UE), the start information for each UE identifying a first physical channel in a sequence of dedicated physical channels dedicated to the UE; and forming a second part of the signaling message, the second part of the signaling message for transmission in second parts of the shared control channels, the second part of the signaling message including end information for more than one UE, the end information for each UE identifying a last physical channel in the sequence of dedicated physical channels to the UE.

28. The method of claim 27, wherein the start information and the end information are channelization codes.

29. The method of claim 27, wherein at least one of the first and second parts of the signaling message includes identification information identifying the UEs.

30. The method of claim 29, wherein the at least one of the first and second parts of the signaling message includes a single error correction code for the identification information.

31. The method of claim 27, wherein the at least one of the first and second parts of the signaling message includes a single error correction code for at least a portion of the data in the at least one of the first and second part.

32. The method of claim 1, wherein at least one shared control channel carries information for more than one user equipment during the transmission of the signaling message on the shared control channels to a plurality of UEs over a transmission time interval.

33. The method of claim 6, wherein at least one shared control channel carries information for more than one user equipment during the transmission of the signaling message on the shared control channels to a plurality of UEs over a transmission time interval.

34. The method of claim 11, wherein the different portion of the composite signaling message part includes data for different user equipment (UE).

35. The method of claim 17, wherein at least one shared control channel carries information for more than one user equipment during the transmission of a different portion of the composite signaling message part over at least one same time slot in each of the shared control channels.

* * * * *